(12) United States Patent
Kawahira et al.

(10) Patent No.: US 10,795,197 B2
(45) Date of Patent: Oct. 6, 2020

(54) LIQUID CRYSTAL PANEL

(71) Applicant: Sharp Kabushiki Kaisha, Sakai, Osaka (JP)

(72) Inventors: Yuichi Kawahira, Sakai (JP); Koji Murata, Sakai (JP); Takako Koide, Sakai (JP); Masahiro Hasegawa, Sakai (JP); Akira Sakai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/546,584

(22) Filed: Aug. 21, 2019

(65) Prior Publication Data

US 2020/0064671 A1 Feb. 27, 2020

Related U.S. Application Data

(60) Provisional application No. 62/722,285, filed on Aug. 24, 2018.

(51) Int. Cl.
*G02F 1/1333* (2006.01)
*G06F 3/041* (2006.01)
*G02F 1/1347* (2006.01)

(52) U.S. Cl.
CPC ........ *G02F 1/13338* (2013.01); *G02F 1/1347* (2013.01); *G06F 3/0412* (2013.01)

(58) Field of Classification Search
CPC .................................................. G02F 1/13338
See application file for complete search history.

(56) References Cited

U.S. PATENT DOCUMENTS

| | | | | |
|---|---|---|---|---|
| 6,559,916 B1* | 5/2003 | Urabe | ................. | G02F 1/13725 349/113 |
| 2001/0008433 A1* | 7/2001 | Fujii | ................... | G02F 1/13338 349/12 |
| 2009/0002580 A1* | 1/2009 | Matsushima | ....... | G02F 1/13338 349/12 |
| 2011/0261296 A1* | 10/2011 | Park | ................... | G02F 1/133502 349/96 |
| 2012/0268914 A1* | 10/2012 | Masumoto | ............. | G06F 3/044 362/19 |
| 2013/0002994 A1* | 1/2013 | Wang | ................... | G02F 1/13338 349/96 |
| 2014/0368467 A1* | 12/2014 | Park | ........................ | G06F 3/044 345/174 |
| 2019/0004647 A1 | 1/2019 | Yamashita et al. | | |
| 2019/0155082 A1* | 5/2019 | Sakai | ................ | G02F 1/133528 |

FOREIGN PATENT DOCUMENTS

JP 2008-249943 A 10/2008
WO 2017/014252 A1 1/2017

* cited by examiner

*Primary Examiner* — Sang V Nguyen
(74) *Attorney, Agent, or Firm* — Keating & Bennett, LLP

(57) ABSTRACT

The present invention relates to a liquid crystal panel including in the following order from a viewing surface side: an antireflection film; a circularly polarizing plate including a linearly polarizing plate and an out-cell retarder; a touch panel including a support and a detection electrode; a panel substrate; and an in-cell retarder, the support having a retardation slow axis that forms an angle of 40° to 50° with a slow axis of the in-cell retarder and with a slow axis of the out-cell retarder, the support having a retardation of 3 nm or smaller.

3 Claims, 7 Drawing Sheets

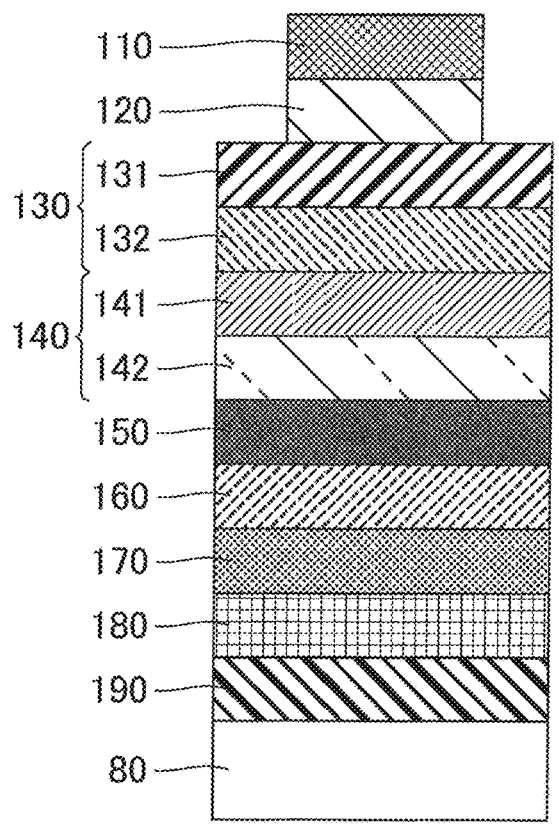

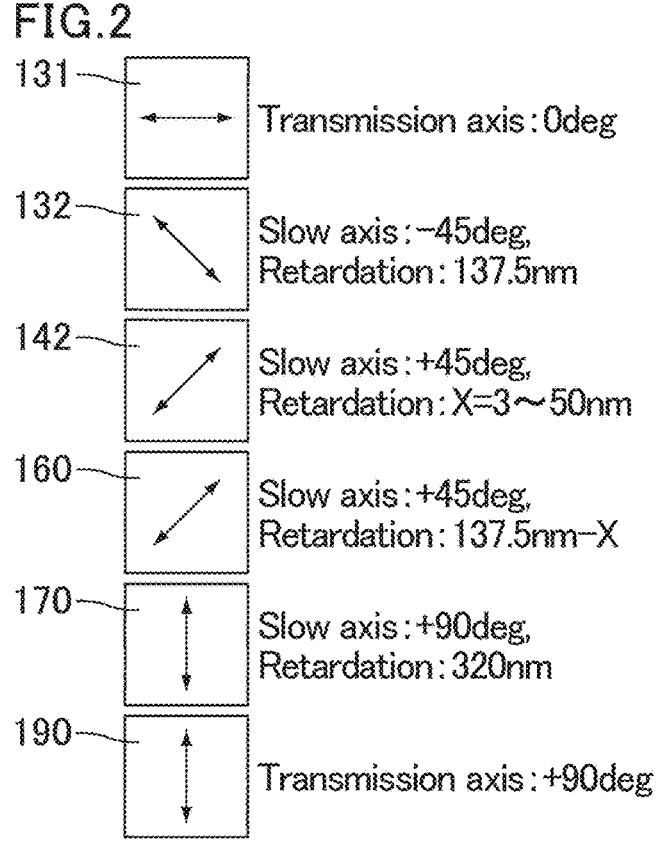
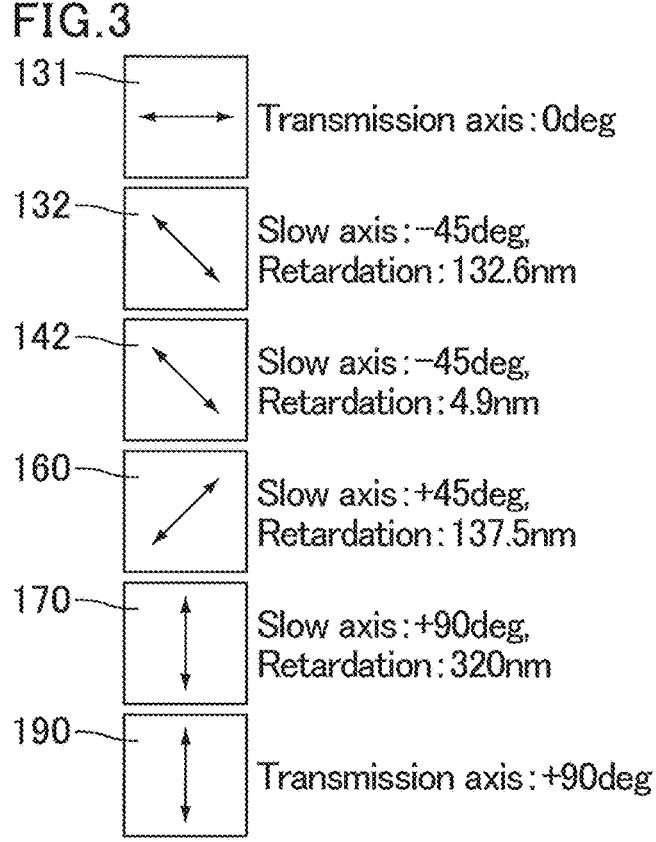

LIQUID CRYSTAL PANEL

CROSS-REFERENCE TO RELATED APPLICATIONS

The present application claims priority under 35 U.S.C. § 119 to U.S. Provisional Application No. 62/722,285 filed on Aug. 24, 2018, the contents of which are incorporated herein by reference in their entirety.

BACKGROUND OF THE INVENTION

Field of the Invention

The present invention relates to liquid crystal panels.

Description of Related Art

Liquid crystal display devices are display devices that use a liquid crystal composition to perform display. Display is typically performed as follows: light is emitted from a backlight to a liquid crystal panel including a liquid crystal composition enclosed between a pair of substrates, and voltage is applied to the liquid crystal composition to change the alignment of liquid crystal molecules, whereby the amount of light transmitted through the liquid crystal panel is controlled. Such liquid crystal display devices have advantageous features such as thin profile, lightweight, and low power consumption, and are thus used in electronic devices such as smartphones, tablet personal computers, and automotive navigation systems. Recent liquid crystal display devices often include a touch panel.

A technique is known in which a circularly polarizing plate is disposed on a surface of a liquid crystal panel to suppress reflection of light therearound (external light), and thereby achieving improved outdoor visibility (bright-place visibility) of the liquid crystal display device. Unfortunately, when such a liquid crystal panel, whose bright-place visibility has been improved by disposing a circularly polarizing plate, is retrofitted with a touch panel, the bright-place visibility thereof decreases.

JP 2008-249943 A discloses a transflective liquid crystal panel in which liquid crystals are energized according to a transverse electric field drive mode. The liquid crystal panel includes an observer-side circularly polarizing plate and a touch panel on an inner side thereof, whereby the reduction of the contrast ratio due to the reflection by the touch panel is suppressed. In order to achieve display by transmitted light, the liquid crystal panel includes a compensator outside a liquid crystal cell and a circularly polarizing plate as a backlight-unit-side polarizing plate.

WO 2017/014252 discloses a touch-panel-equipped display device including: an active matrix substrate; a counter substrate opposed to the active matrix substrate; a liquid crystal layer interposed between the active matrix substrate and the counter substrate; a display control element formed on the active matrix substrate; a first insulating film formed on the active matrix substrate, on a liquid crystal layer side with respect to the display control element; a plurality of pixel electrodes formed on the active matrix substrate, on a liquid crystal layer side with respect to the first insulating film; a second insulating film formed on the active matrix substrate, on a liquid crystal layer side with respect to the pixel electrodes; a plurality of counter electrodes formed on the active matrix substrate, on a liquid crystal layer side with respect to the second insulating film, the counter electrodes and the pixel electrodes having electrostatic capacitances therebetween; a control unit provided on the active matrix substrate, the control unit detecting a touch position by supplying a touch driving signal to the counter electrodes; and signal lines for connecting the control unit and the counter electrodes, and supplying the touch driving signal from the control unit to the counter electrodes, wherein the signal lines are formed on the active matrix substrate, between the first insulating film and the second insulating film.

BRIEF SUMMARY OF THE INVENTION

FIG. 10 is a figure illustrating reflection of external light incident on a liquid crystal panel having on a surface thereof a circularly polarizing plate. As shown in FIG. 10, an antireflection film 110 suppresses the reflection from the panel surface. A circularly polarizing plate 130 suppresses the reflection from the inside of the liquid crystal panel. A color filter substrate 150 suppresses the reflection from the surface of a TFT substrate 180.

FIG. 11 is a figure illustrating reflection of incident external light when a liquid crystal panel having on a surface thereof a circularly polarizing plate is retrofitted with a touch panel. As shown in FIG. 11, the reflection from an out-cell touch panel 340 is not suppressed.

An out-cell touch panel, which is equipped outside a liquid crystal panel, typically includes a transparent support and a transparent detection electrode, and is bonded to a panel via an optically transparent adhesive layer. Unfortunately, the support and the detection electrode have refractive indices significantly different from those of the surrounding members to cause reflection on both interfaces of the touch panel when external light is incident on the touch panel surface.

In the case where a touch panel is bonded to a liquid crystal panel having on a surface thereof a circularly polarizing plate (hereinafter, also referred to as a "low reflective liquid crystal panel"), the liquid crystal panel has additional reflection due to the retrofitted touch panel although the circularly polarizing plate can cancel almost all the internal reflection of the liquid crystal panel. As a result, the liquid crystal display device has increased reflectance of as a whole. This leads to deteriorated bright-place visibility.

The liquid crystal panel of JP 2008-249943 A allows its transparent part to provide black display by (1) the setting in which the retardation between the liquid crystal layer and the compensator are the same and the slow axes thereof are in a perpendicular arrangement, and (2) the setting in which the absorption axes of the observer side circularly polarizing plate and the backlight side circularly polarizing plate are in a perpendicular arrangement, and the slow axes of the observer side circularly polarizing plate and the backlight side circularly polarizing plate are in a perpendicular arrangement. Unfortunately, the retardation of the liquid crystal layer widely varies depending on factors such as temperature and the thickness of the cell. Thereby, the contrast ratio more depends on temperature and more varies in a plane.

In addition, JP 2008-249943 A fails to discuss the presence of retardation of the support itself of the touch panel. Even a slight retardation of the support of the touch panel lowers the antireflection performance of the circularly polarizing plate and the contrast ratio (increases the black luminance).

The present invention was made under the current situation in the art and aims to provide a liquid crystal panel functioning as a touch panel and achieving suppression of external light reflection and good outdoor visibility.

(1) An embodiment of the present invention relates to a liquid crystal panel including in the following order from a viewing surface side: an antireflection film; a circularly polarizing plate including a linearly polarizing plate and an out-cell retarder; a touch panel including a support and a detection electrode; a panel substrate; and an in-cell retarder, the support having a retardation slow axis that forms an angle of 40° to 50° with a slow axis of the in-cell retarder and with a slow axis of the out-cell retarder, the support having a retardation of 3 nm or smaller.

(2) An embodiment of the present invention relates to a liquid crystal panel including in the following order from a viewing surface side: an antireflection film; a circularly polarizing plate including a linearly polarizing plate and an out-cell retarder; a touch panel including a support and a detection electrode; a panel substrate; and an in-cell retarder, the support having a retardation slow axis that forms an angle of −5° to +5° with a slow axis of the in-cell retarder and an angle of 85° to 95° with a slow axis of the out-cell retarder, the support having a retardation of greater than 3 nm and smaller than 50 nm, a sum of the retardation of the support and the retardation of the in-cell retarder being 117.5 nm to 157.5 nm.

(3) An embodiment of the present invention relates to a liquid crystal panel including in the following order from a viewing surface side: an antireflection film; a circularly polarizing plate including a linearly polarizing plate and an out-cell retarder; a touch panel including a support and a detection electrode; a panel substrate; and an in-cell retarder, the support having a retardation slow axis that forms an angle of 85° to 95° with a slow axis of the in-cell retarder and an angle of −5° to +5° with a slow axis of the out-cell retarder, the support having a retardation of greater than 3 nm and smaller than 137.5 nm, a sum of the retardation of the support and the retardation of the out-cell retarder being 117.5 nm to 157.5 nm.

(4) An embodiment of the present invention relates to a liquid crystal panel including in the following order from a viewing surface side: an antireflection film; a circularly polarizing plate including a linearly polarizing plate and an out-cell retarder; a touch panel including a detection electrode; a panel substrate directly in contact with the detection electrode; and an in-cell retarder.

(5) An embodiment of the present invention relates to a liquid crystal panel including in the following order from a viewing surface side: an antireflection film; a circularly polarizing plate including a linearly polarizing plate and an out-cell retarder; a panel substrate; an in-cell retarder; and a panel substrate functioning as a touch panel.

The present invention can provide a liquid crystal panel functioning as a touch panel and achieving suppression of external light reflection and good outdoor visibility.

BRIEF DESCRIPTION OF THE DRAWINGS

FIG. 1A is a schematic cross-sectional view showing the structure of a liquid crystal display device of Embodiment 1.

FIG. 1B is a figure illustrating the positional relations between the axes of optical members included in a liquid crystal panel of Embodiment 1.

FIG. 2 is a figure illustrating the positional relations between the axes of optical members included in a liquid crystal panel of Embodiment 2.

FIG. 3 is a figure illustrating the positional relations between the axes of optical members included in a liquid crystal panel of Embodiment 3.

DETAILED DESCRIPTION OF THE INVENTION

Term Definition

Figure 4A:
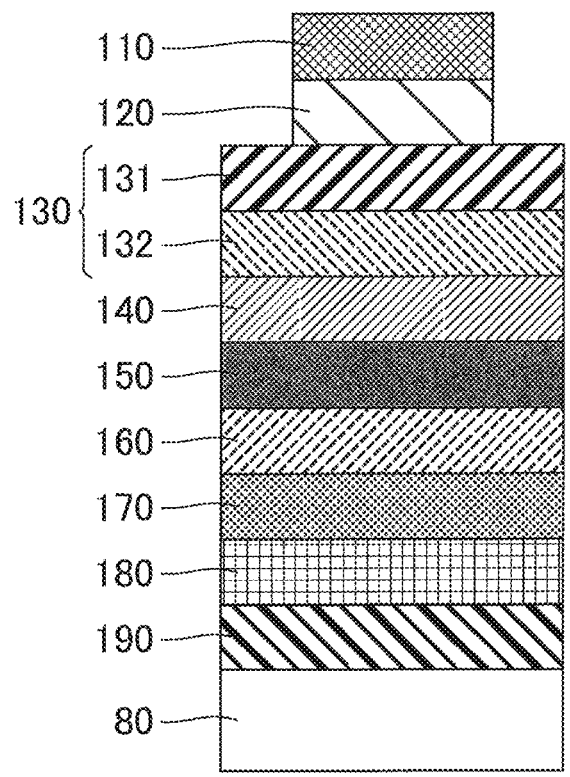
FIG. 4A is a schematic cross-sectional view showing the structure of a liquid crystal display device of Embodiment 4.

The "viewing surface side" as used herein means the side closer to the screen (display surface) of the liquid crystal display device, and the "back surface side" means the side farther from the screen (display surface) of the display device.

The "retardation" as used herein means the in-plane retardation to light having a wavelength of 550 nm, unless otherwise stated.

The "λ/4 retarder" as used herein means a retarder providing an in-plane retardation of ¼ wavelength to at least light having a wavelength of 550 nm, and may be any retarder providing an in-plane retardation of 100 nm or greater and 176 nm or smaller. Light having a wavelength of 550 nm is light of a wavelength at which a human has the highest visual sensitivity. The in-plane retardation is defined as $R=(ns-nf) \times d$, where ns represents the in-plane principal refractive index nx or ny of the retarder, whichever is greater, nf represents the in-plane principal refractive index nx or ny of the retarder, whichever is smaller, and d represents the thickness of the retarder. The principle refractive indexes are values for light having a wavelength of 550 nm, unless otherwise stated. The slow axis of a retarder means an axis extending in the direction corresponding to ns, and the fast axis thereof means an axis extending in the direction corresponding to nf.

Hereinafter, embodiments of the present invention will be described. The following embodiments, however, are not intended to limit the scope of the present invention. The present invention may appropriately be modified within the scope of the configuration of the present invention.

In an embodiment of the present invention, a touch panel is disposed between a circularly polarizing plate and a color filter substrate so that the circularly polarizing plate suppresses reflection from the inside of the touch panel. This structure can suppress an increase in external light reflection caused by introduction of the touch panel. In this case, preferably, the support of the touch panel has no retardation (a retardation to light with a wavelength of 550 nm of smaller than 3 nm), or no support is disposed. A touch panel including a support having a retardation of 3 nm or greater may lower the antireflection performance of the circularly polarizing plate or the contrast ratio of the low reflective liquid crystal panel (may increase the black luminance). These problems can be solved by, for example, setting the retardation slow axis of the support of the touch panel parallel to the in-cell retardation slow axis of the low reflective liquid crystal panel, and setting the value of the in-cell retardation to be a value given by subtracting the retardation of the support of the touch panel from 137.5 nm.

In another embodiment of the present invention, a TFT substrate is imparted with a function of a touch panel (in-cell touch panel). This structure can also suppress an increase in external light reflection caused by introduction of the touch panel.

Embodiment 1

FIG. 1A is a schematic cross-sectional view showing the structure of a liquid crystal display device of Embodiment 1. As shown in FIG. 1A, a liquid crystal display device of the present embodiment includes a liquid crystal panel including, in the order from the viewing surface side, an antireflection film 110, cover glass 120, a circularly polarizing plate 130, an on-cell touch panel 140, a color filter substrate (panel substrate) 150, a λ/4 retarder (in-cell retarder) 160, a horizontally aligned liquid crystal layer 170, a TFT substrate 180, and a linearly polarizing plate 190.

A combination of the color filter substrate 150, the λ/4 retarder 160, the horizontally aligned liquid crystal layer 170, and the TFT substrate 180 is also referred to as a "liquid crystal cell". The region between the color filter substrate 150 and the TFT substrate 180 is referred to as "in-cell", and the region on the viewing surface side of the color filter substrate 150 and the region on the back surface side of the TFT substrate 180 are referred to as "out-cell".

The antireflection film 110 is disposed on the outermost surface of the liquid crystal panel. The anti-reflection film 110 is, for example, a moth-eye film having a surface structure resembling a moth's eye. The cover glass 120 supports the antireflection film 110.

The circularly polarizing plate 130 consists of a linearly polarizing plate 131 and a λ/4 retarder (out-cell retarder) 132.

The linearly polarizing plate 131 can be, for example, a polarizer (absorptive polarizing plate) obtained by dyeing a polyvinyl alcohol (PVA) film with an anisotropic material such as an iodine complex (or a dye) to adsorb the material on the PVA film and stretch-aligning the material. Typically, in order to achieve a mechanical strength and moist heat resistance, each surface of the PVA film is laminated with a protective film such as a triacetyl cellulose (TAC) film for practical use.

The out-cell retarder 132 can be formed on the on-cell touch panel 140 by bonding, and thus a stretched polymer film generally used in the field of liquid crystal display devices is preferred. The polymer film may be formed from, for example, a cycloolefin polymer, polycarbonate, polysulfone, polyethersulfone, polyethylene terephthalate, polyethylene, polyvinyl alcohol, norbornene, triacetyl cellulose, or diacetyl cellulose, particularly preferably from a cycloolefin polymer. A retardation layer formed from a cycloolefin polymer has advantages including excellent durability and small retardation changes in long-term exposure to a high-temperature environment or a high-temperature, high-humidity environment. Known examples of the cycloolefin polymer film include "Zeonor Film®" available from Zeon Corporation and "ARTON® film" available from JSR Corporation.

The on-cell touch panel 140 is disposed in contact with the color filter substrate 150 and consists of a detection electrode 141 and a support 142. The detection electrode 141 may be formed from, for example, indium tin oxide (ITO). The support 142 is preferably a film formed from a material with a small retardation, and may be, for example, a film formed from a cycloolefin polymer. The on-cell touch panel 140 may be attached to the color filter substrate 150 via an optical adhesive sheet.

The color filter substrate 150 may be, for example, a product in which a color filter layer and a black matrix are formed on a support such as a glass substrate or a plastic substrate. The color filter layer includes, for example, red color filters, green color filters, and blue color filters arranged in a plane. The red color filters, green color filters, and blue color filters are each partitioned by the black matrix. The red color filters, the green color filters, the blue color filters, and the black matrix each are, for example, formed from a transparent resin containing a pigment. Typically, a red color filter, a green color filter, and a blue color filter in combination are disposed in each and every pixel, and the desired color can be produced for the pixel by mixing colored lights transmitted through the red color filter, the green color filter, and the blue color filter while controlling the amounts of the colored lights.

The color filter substrate 150 may include an overcoat layer that covers the surface of the color filter layer. The overcoat layer can prevent impurities in the color filter layer from dissolving to other layers and can flatten the surface of the color filter layer. The overcoat layer is preferably formed from a transparent resin.

The in-cell retarder 160 is preferably formed from a cured product of a reactive liquid crystal polymer (also referred to as a "reactive mesogen"). With the reactive liquid crystal polymer, the in-cell retarder 160 can be formed by coating during the production process of the color filter substrate, so that the liquid crystal display panel can be reduced in thickness.

The reactive liquid crystal polymer is preferably a liquid crystal polymer having a photoreactive group. Examples of the reactive liquid crystal polymer having a photoreactive group include polymers having a side chain including both a substituent (mesogen group) such as a biphenyl group, a terphenyl group, a naphthalene group, a phenyl benzoate group, an azobenzene group, or a derivative thereof and a photoreactive group such as a cinnamoyl group, a chalcone group, a cinnamylidene group, a β-(2-phenyl)acryloyl group, a cinnamic acid group, or a derivative thereof, and a main chain derived from an acrylate, a methacrylate, maleimide, N-phenylmaleimide, or a siloxane. The polymer may be a homopolymer containing only a single type of repeat unit, or may be a copolymer containing two or more types of repeat units with different side chain structures. The copolymer includes copolymers such as alternating copolymers, random copolymers, and graft copolymers. In each copolymer, a side chain of at least one repeat unit has a mesogen group and a photoreactive group such as those described above together, but a side chain of another repeat unit may contain no mesogen group or no photoreactive group.

Examples of the solvent used for coating with the reactive liquid crystal polymer include toluene, ethylbenzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methylcyclohexane, tetrahydrofuran, dioxane, cyclohexanone, n-hexane, ethyl acetate, butyl acetate, propylene glycol methyl ether acetate, methoxybutyl acetate, N-methylpyrrolidone, and dimethylacetamide. These may be used alone or in combination with each other.

The retardation layer can be formed from a reactive liquid crystal polymer by, specifically, the following method. A base alignment film is formed on the color filter substrate 150, and is subjected to an alignment treatment such as rubbing or photoirradiation for alignment azimuth determination. The base alignment film having been subjected to the alignment treatment is coated with a reactive liquid crystal polymer, which is then cured by a method such as baking or photoirradiation. The molecules of the cured reactive liquid crystal polymer are aligned at the alignment azimuth provided by the base alignment film, so that the material functions as a retardation layer. The retardation provided by the retardation layer is typically determined as a product of the birefringence Δn of the reactive liquid crystal polymer and the thickness d of the retardation layer. The retardation layer may be formed on the color filter substrate 150 by transferring a layer of a cured material of a reactive liquid crystal polymer on the color filter substrate 150 using a transferring film including the layer of a cured material of a reactive liquid crystal polymer on a base film such as a PET film.

The horizontally aligned liquid crystal layer 170 contains liquid crystal molecules horizontally aligned with no voltage applied. The liquid crystal molecules are preferably negative liquid crystal molecules. On the surfaces sandwiching the horizontally aligned liquid crystal layer 170 in between are each provided with a horizontally aligned film (not shown) that controls the alignment of liquid crystal molecules. The horizontally aligned film may be formed from, for example, a material for a decomposable photoalignment film, although not being limited thereto. The liquid crystal molecules in the horizontally aligned liquid crystal layer 170 are horizontally aligned by the control force of the horizontally aligned films when no voltage is applied between the pair of electrodes (with no voltage applied) in the TFT substrate 180. In contrast, the liquid crystal molecules rotate in an in-plane direction in response to the transverse electric fields generated in the horizontally aligned liquid crystal layer 170 when voltage is applied between the pair of electrodes (with voltage applied).

The TFT substrate 180 includes a pair of electrodes and is configured to generate a transverse electric field in the horizontally aligned liquid crystal layer 170. The liquid crystal display device of the present embodiment may be driven in a transverse electric field mode such as the fringe field switching (FFS) mode or the in-plane switching (IPS) mode.

The linearly polarizing plate 190 can be, for example, a polarizer (absorptive polarizing plate) obtained by dyeing a polyvinyl alcohol (PVA) film with an anisotropic material such as an iodine complex (or a dye) to adsorb the material on the PVA film and stretch-aligning the material. Typically, in order to achieve a mechanical strength and moist heat resistance, each surface of the PVA film is laminated with a protective film such as a triacetyl cellulose (TAC) film for practical use.

The liquid crystal panel is provided on the back surface side thereof a backlight 80. The amount of light emitted from the backlight 80 and transmitted by the liquid crystal panel is controlled by the voltage applied to the horizontally aligned liquid crystal layer 170 in the liquid crystal panel. The backlight 80 may be of any type and may be, for example, an edge-lit backlight or a direct-lit backlight. The backlight 80 may utilize any light source such as a light emitting diode (LED) or a cold cathode fluorescent lamp (CCFL).

FIG. 1B is a figure illustrating the positional relations between the axes of optical members included in the liquid crystal panel of Embodiment 1. Arrows in FIG. 1B indicate directions of axes as viewed from the viewing surface side. As shown in FIG. 1B, when the direction (azimuth angle) of the transmission axis of the linearly polarizing plate 131 is defined as 0°, the out-cell retarder 132 has a slow axis at −45° and a retardation of 137.5 nm, the support 142 of the on-cell touch panel 140 has a slow axis at 0° and a retardation of 3 nm or smaller, the in-cell retarder 160 has a slow axis at +45° and a retardation of 137.5 nm, the horizontally aligned liquid crystal layer 170 has a slow axis at +90° and a retardation of 320 nm, and the linearly polarizing plate 190 has a transmission axis at 90°. In other words, the retardation slow axis of the support 142 forms an angle of 45° with slow axis of the out-cell retarder 132 and with the slow axis of the in-cell retarder 160. In the structure of Embodiment 1, the retardation slow axis of the support 142 may form an angle in the range of 40° to 50° with the slow axis of the in-cell retarder 160 and with the slow axis of the out-cell retarder 132.

When the liquid crystal panel includes, in addition to the support 142, a different member with a retardation between the out-cell retarder 132 and the in-cell retarder 160, this member preferably has a retardation of 3 nm or smaller. Examples of the different member include an optical adhesive sheet for bonding the on-cell touch panel 140 and the color filter substrate 150 together.

In Embodiment 1, the on-cell touch panel 140 is disposed between the circularly polarizing plate 130 and the color filter substrate 150. The structure in which the on-cell touch panel 140 is disposed inside (on the in-cell side of) the circularly polarizing plate 130 allows the circularly polarizing plate 130 to absorb the reflection caused by the on-cell touch panel 140. In addition, use of a cycloolefin polymer as a material of the support 142 of the on-cell touch panel 140 reduces the retardation of the support 142 to 3 nm or smaller. The structure with the support 142 having a reduced retardation achieves provision of original black display by the liquid crystal display device (low reflective liquid crystal display device) which has antireflection performance and includes on a panel surface thereof the circularly polarizing plate 130.

In the structure of Embodiment 1, the retardation slow axis of the support 142 in the on-cell touch panel 140 is set at 45° with the slow axis of the in-cell retarder 160 and with the slow axis of the out-cell retarder 132. Thus, if the support 142 has a retardation of 3 nm or greater, the retardation cancellation between the in-cell retarder 160 and the out-cell retarder 132 is inhibited. This increases the light leakage in the black display state, resulting in a reduced contrast ratio of the display device in a dark room (DCR). Meanwhile, the contrast ratio of the display device under ambient light (ACR) is mainly controlled by the white luminance (Lw)

and the reflectance (Rs+Ri) and thus is not seriously influenced by the retardation of the support 142.

Typically, the contrast ratio of the display under ambient light (ACR) and the contrast ratio of the display device in a dark room (DCR) are defined by the following formulas.

$$ACR=(Lw+La\times(Rs+Ri))/(Lb+La\times(Rs+Ri)),$$
$$DCR=Lw/Lb \qquad \text{[Math. 1]}$$

In the formulas, Lw represents the luminance when the display provides entirely white display (255 gray scale), Lb represents the luminance when the display provides entirely black display (0 gray scale), La represents the ambient light luminance (=ambient light illuminance÷2π), Rs represents the reflectance of the display surface, and Ri represents the reflectance inside the display.

Here, subjective evaluations were made as follows. Liquid crystal panels with various ACRs were prepared. Then, 30 evaluators made a 5-point-scale evaluation for the appearance of display under ambient light at 20000 lx. The ACR at which the scores by all the evaluators were 3 points or higher was 10:1 or higher. Therefore, an ACR of 10:1 under ambient light at 20000 lx is made the minimum target for assuring outdoor visibility.

The structure of the present embodiment is different from the structure in JP 2008-249943 A in the following points.

In the case of a low reflective liquid crystal panel, the absorption axis of the backlight side polarizing plate is parallel to or perpendicular to the slow axis of the liquid crystal layer. The liquid crystal layer thus functions as an optically isotropic medium to light from the backlight. Accordingly, even when the retardation of the liquid crystal layer is varied by the temperature or the thickness of the cell, the variation does not adversely influence the provision of black display.

Examples 1 to 4 and Comparative Example 1

In liquid crystal display devices having the structure of Embodiment 1, the retardation of the support 142 formed from a cycloolefin polymer (COP) was set to 0.5 nm (Example 1), 1.2 nm (Example 2), 1.9 nm (Example 3), 3.0 nm (Example 4), or 4.9 nm (Comparative Example 1). The liquid crystal display devices were each measured for the surface reflectance (Rs), the internal reflectance (Ri), the white luminance (Lw), and the black luminance (Lb), and the dark room contrast ratio at 0.1 lx (DCR) and the contrast ratio at 20000 lx (ACR) were calculated. Table 1 shows the results.

high DCR was achieved in transverse electric field mode display devices including on the panel surface thereof a circularly polarizing plate.

In a display panel in which the retardation slow axis of the support 142 in the touch panel was set at 450 with the slow axis of the in-cell retarder and with the slow axis of the out-cell retarder, the black luminance was found to be increased by even a slight increase in retardation of the support 142. The target for the display quality in a dark room in the subjective evaluation can be achieved when the DCR is 500:1 or higher. Accordingly, the structure of Embodiment 1 having a retardation of the support 142 of 3 nm or smaller can achieve sufficient visibility both in a bright room and in a dark room.

Embodiment 2

A liquid crystal display device of Embodiment 2 has the same structure as the liquid crystal display device of Embodiment 1 as shown in FIG. 1A, except for the direction of the axis and the retardation of the support 142 in the on-cell touch panel 140 and the retardation of the in-cell retarder 160.

FIG. 2 is a figure illustrating the positional relations between the axes of optical members included in the liquid crystal panel of Embodiment 2. Arrows in FIG. 2 indicate directions of axes as viewed from the viewing surface side. As shown in FIG. 2, when the direction (azimuth angle) of the transmission axis of the linearly polarizing plate 131 is defined as 0°, the out-cell retarder 132 has a slow axis at −45° and a retardation of 137.5 nm, the support 142 of the on-cell touch panel 140 and the in-cell retarder 160 each have a slow axis at +45°, the horizontally aligned liquid crystal layer 170 has a slow axis at +90° and a retardation of 320 nm, and the linearly polarizing plate 190 has a transmission axis at 90°. In other words, the retardation slow axis of the support 142 in the on-cell touch panel 140 forms an angle of 90° with the slow axis of the out-cell retarder 132 and 0° with the slow axis of the in-cell retarder 160. In addition, the support 142 has a retardation of greater than 3 nm and smaller than 50 nm, and the sum of the retardation of the support 142 and the retardation of the in-cell retarder 160 is set to 137.5 nm, which is a λ/4 condition. In the structure of Embodiment 2, the retardation slow axis of the support 142 may form an angle in the range of −5° to +5° to the slow axis of the in-cell retarder 160 and in the range of 85° to 95° to the slow axis of the out-cell retarder 132. The

TABLE 1

|  | Example 1 | Example 2 | Example 3 | Example 4 | Comparative Example 1 |
|---|---|---|---|---|---|
| Support in touch panel | COP Retardation 0.5 nm | COP Retardation 1.2 nm | COP Retardation 1.9 nm | COP Retardation 3.0 nm | COP Retardation 4.9 nm |
| Surface reflectance (Rs) | 0.37% | 0.37% | 0.37% | 0.37% | 0.37% |
| Internal reflectance (Ri) | 0.15% | 0.15% | 0.16% | 0.16% | 0.17% |
| White luminance (Lw) | 400 cd/m² | 400 cd/m² | 400 cd/m² | 400 cd/m² | 400 cd/m² |
| Black luminance (Lb) | 0.50 cd/m² | 0.52 cd/m² | 0.58 cd/m² | 0.73 cd/m² | 2.94 cd/m² |
| DCR (0.1 lx) | 800:1 | 775:1 | 885:1 | 550:1 | 135:1 |
| ACR (20000 lx) | 24:1 | 24:1 | 24:1 | 24:1 | 20:1 |

As shown in Table 1, the liquid crystal panels of Examples 1 to 4, including a touch panel with a small retardation between the circularly polarizing plate and the color filter substrate, achieved a reduced internal reflectance. Thereby, the ACRs were much higher than 10:1. Thus, display at a sum of the retardation of the support 142 and the retardation of the in-cell retarder 160 may fall within the range of 117.5 to 157.5 nm.

When the liquid crystal panel includes, in addition to the support 142, a different member with a retardation between the out-cell retarder 132 and the in-cell retarder 160, this member preferably has a retardation of 3 nm or smaller. Examples of the different member include an optical adhesive sheet for bonding the on-cell touch panel 140 and the color filter substrate 150 together.

In Embodiment 2, the on-cell touch panel 140 is disposed inside (on the in-cell side of) the circularly polarizing plate 130 and the retardation slow axis of the support 142 in the on-cell touch panel 140 is set parallel to the slow axis of the in-cell retarder 160. This structure enables the support 142 and the in-cell retarder 160 to be collectively recognized as one retarder. In addition, setting the sum of the retardation of the in-cell retarder 160 and the retardation of the support 142 in the on-cell touch panel 140 to 137.5 nm, which is a λ/4 condition, achieves liquid crystal display at a high DCR and a high ACR even when the display panel includes the support 142 having a retardation of greater than 3 nm (upper limit value in Embodiment 1). However, the support 142 having too great a retardation inhibits the effect of suppressing the internal reflection of the liquid crystal panel. The support 142 thus should have a retardation of smaller than 50 nm in terms of achieving an ACR of 10:1 or higher.

Examples 5 to 8 and Comparative Example 2

In liquid crystal display devices having the structure of Embodiment 2, the retardation of the support 142 formed from a cycloolefin polymer (COP) was set to 4.9 nm (Example 5), 10.0 nm (Example 6), 17.5 nm (Example 7), 40.5 nm (Example 8), or 77.5 nm (Comparative Example 2). The liquid crystal display devices were each measured for the surface reflectance (Rs), the internal reflectance (Ri), the white luminance (Lw), and the black luminance (Lb), and the dark room contrast ratio at 0.1 lx (DCR) and the contrast ratio at 20000 lx (ACR) were calculated. Table 2 shows the results.

FIG. 3 is a figure illustrating the positional relations between the axes of optical members included in the liquid crystal panel of Embodiment 3. Arrows in FIG. 3 indicate directions of axes as viewed from the viewing surface side. As shown in FIG. 3, when the direction (azimuth angle) of the transmission axis of the linearly polarizing plate 131 is defined as 0°, the out-cell retarder 132 has a slow axis at −45° and a retardation of 132.6 nm, the support 142 of the on-cell touch panel 140 has a slow axis at −45° and a retardation of 4.9 nm, the in-cell retarder 160 has a slow axis at +45° and a retardation of 137.5 nm, the horizontally aligned liquid crystal layer 170 has a slow axis at +90° and a retardation of 320 nm, and the linearly polarizing plate 190 has a transmission axis at 90°. In other words, the retardation slow axis of the support 142 in the on-cell touch panel 140 forms an angle of 0° to the slow axis of the out-cell retarder 132 and 90° to the slow axis of the in-cell retarder 160. In addition, the sum of the retardation of the support 142 and the retardation of the out-cell retarder 132 is set to 137.5 nm, which is a λ/4 condition. In the structure of Embodiment 3, the retardation slow axis of the support 142 may form an angle in the range of 85° to 95° to the slow axis of the in-cell retarder 160 and in the range of −5° to +5° to the slow axis of the out-cell retarder 132. The sum of the retardation of the support 142 and the retardation of the out-cell retarder 132 may fall within the range of 117.5 to 157.5 nm.

When the liquid crystal panel includes, in addition to the support 142, a different member with a retardation between the out-cell retarder 132 and the in-cell retarder 160, this member preferably has a retardation of 3 nm or smaller. Examples of the different member include an optical adhesive sheet for bonding the on-cell touch panel 140 and the color filter substrate 150 together.

In Embodiment 3, the on-cell touch panel 140 is disposed inside (on the in-cell side of) the circularly polarizing plate

TABLE 2

|  | Example 5 | Example 6 | Example 7 | Example 8 | Comparative Example 2 |
| --- | --- | --- | --- | --- | --- |
| Support in touch panel | COP Retardation 4.9 nm | COP Retardation 10.0 nm | COP Retardation 17.5 nm | COP Retardation 40.5 nm | COP Retardation 77.5 nm |
| Surface reflectance (Rs) | 0.37% | 0.37% | 0.37% | 0.37% | 0.37% |
| Internal reflectance (Ri) | 0.16% | 0.17% | 0.30% | 0.42% | 1.09% |
| White luminance (Lw) | 400 cd/m$^2$ | 400 cd/m$^2$ | 400 cd/m$^2$ | 400 cd/m$^2$ | 400 cd/m$^2$ |
| Black luminance (Lb) | 0.51 cd/m$^2$ | 0.51 cd/m$^2$ | 0.51 cd/m$^2$ | 0.51 cd/m$^2$ | 0.51 cd/m$^2$ |
| DCR (0.1 lx) | 790:1 | 790:1 | 790:1 | 790:1 | 790:1 |
| ACR (20000 lx) | 24:1 | 24:1 | 19:1 | 16:1 | 9:1 |

In the structure of Embodiment 1, when the retardation of the support 142 was 4.9 nm, the DCR was as low as 135:1. In contrast, in the structure of Embodiment 2, as shown in Table 2, even when the retardation of the support 142 was 4.9 nm or greater, the DCR increased to be as high as 790:1. However, the support 142 having too great a retardation reduces the effect of suppressing the internal reflection from the liquid crystal panel, resulting in a reduced ACR.

Embodiment 3

A liquid crystal display device of Embodiment 3 has the same structure as the liquid crystal display device of Embodiment 1 as shown in FIG. 1A, except for the direction of the axis and the retardation of the support 142 in the on-cell touch panel 140 and the retardation of the out-cell retarder 132 in the circularly polarizing plate 130.

130 and the retardation slow axis of the support 142 in the on-cell touch panel 140 is set parallel to the slow axis of the out-cell retarder 132. This structure enables the support 142 and the out-cell retarder 132 to be collectively recognized as one retarder. In addition, setting the sum of the retardation of the out-cell retarder 132 and the retardation of the support 142 in the on-cell touch panel 140 to 137.5 nm, which is a λ/4 condition, achieves liquid crystal display at a high DCR and a high ACR even when the display panel includes the support 142 having a retardation of greater than 3 nm (upper limit value in Embodiment 1).

Example 9

A liquid crystal display device having the structure of Embodiment 3 was measured for the surface reflectance (Rs), the internal reflectance (Ri), the white luminance (Lw), and the black luminance (Lb), and the dark room contrast ratio at 0.1 lx (DCR) and the contrast ratio at 20000 lx (ACR) were calculated. Table 3 shows the results.

TABLE 3

|  | Example 9 |
| --- | --- |
| Support in touch panel | COP Retardation 4.9 nm |
| Surface reflectance (Rs) | 0.37% |
| Internal reflectance (Ri) | 0.15% |
| White luminance (Lw) | 400 cd/m² |
| Black luminance (Lb) | 0.50 cd/m² |
| DCR (0.1 lx) | 795:1 |
| ACR (20000 lx) | 24:1 |

In the structure of Embodiment 1, when the retardation of the support 142 was 4.9 nm, the DCR was as low as 135:1. In contrast, in the structure of Embodiment 3, as shown in Table 3, even when the retardation of the support 142 was 4.9 nm or greater, the DCR increased to be as high as 795:1.

Embodiment 4

A liquid crystal display device of Embodiment 4 is different from that of Embodiment 1 in that the detection electrode of the touch panel is directly formed on the color filter substrate and thereby the on-cell touch panel 140 does not include the support 142.

FIG. 4A is a schematic cross-sectional view showing the structure of the liquid crystal display device of Embodiment 4. As shown in FIG. 4A, the liquid crystal display device of the present embodiment includes a liquid crystal panel including, in the order from the viewing surface side, the antireflection film 110, the cover glass 120, the circularly polarizing plate 130, the on-cell touch panel 140, the color filter substrate (panel substrate) 150, the λ/4 retarder (in-cell retarder) 160, the horizontally aligned liquid crystal layer 170, the TFT substrate 180, and the linearly polarizing plate 190. The liquid crystal panel includes on the back surface side thereof the backlight 80.

The circularly polarizing plate 130 consists of the linearly polarizing plate 131 and the λ/4 retarder (out-cell retarder) 132. The on-cell touch panel 140 is disposed directly on the color filter substrate 150 and consists of a detection electrode only.

Figure 4B:
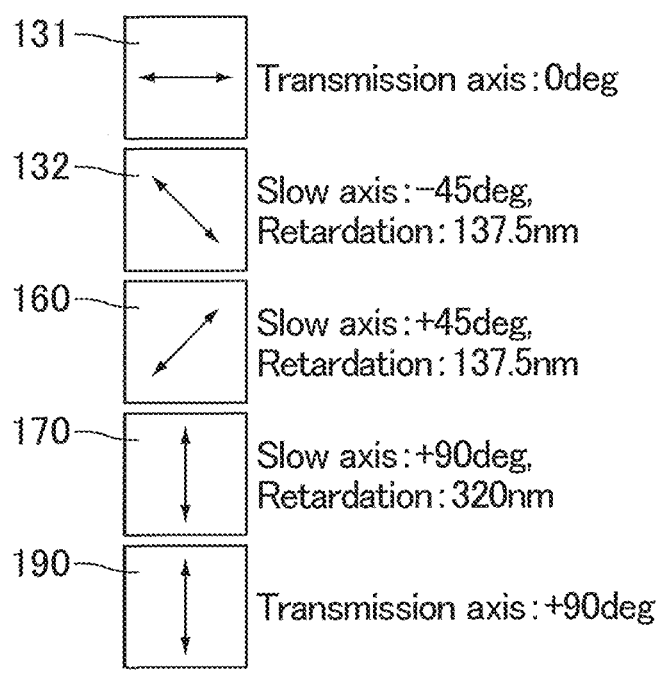
FIG. 4B is a figure illustrating the positional relations between the axes of optical members included in a liquid crystal panel of Embodiment 4.

FIG. 4B is a figure illustrating the positional relations between the axes of optical members included in the liquid crystal panel of Embodiment 4. Arrows in FIG. 4B indicate directions of axes as viewed from the viewing surface side. As shown in FIG. 4B, when the direction (azimuth angle) of the transmission axis of the linearly polarizing plate 131 is defined as 0°, the out-cell retarder 132 has a slow axis at −45° and a retardation of 137.5 nm, the in-cell retarder 160 has a slow axis at +45° and a retardation of 137.5 nm, the horizontally aligned liquid crystal layer 170 has a slow axis at +90° and a retardation of 320 nm, and the linearly polarizing plate 190 has a transmission axis at 90°.

In Embodiment 4, the on-cell touch panel 140 is disposed inside (on the in-cell side of) the circularly polarizing plate 130, and no support for the touch panel, which may have a retardation, is disposed.

Example 10

A liquid crystal display device having the structure of Embodiment 4 was measured for the surface reflectance (Rs), the internal reflectance (Ri), the white luminance (Lw), and the black luminance (Lb), and the dark room contrast ratio at 0.1 lx (DCR) and the contrast ratio at 20000 lx (ACR) were calculated. Table 4 shows the results.

TABLE 4

|  | Example 10 |
| --- | --- |
| Support in touch panel | None |
| Surface reflectance (Rs) | 0.37% |
| Internal reflectance (Ri) | 0.15% |
| White luminance (Lw) | 400 cd/m² |
| Black luminance (Lb) | 0.50 cd/m² |
| DCR (0.1 lx) | 805:1 |
| ACR (20000 lx) | 24:1 |

As shown in Table 4, the structure of Embodiment 4 enables disposition of a touch panel and an increase in both DCR and ACR without causing retardation unnecessary for a low reflective liquid crystal display device.

In Example 10, the detection electrode was formed by performing vapor deposition of a transparent electrode (ITO) directly on the viewing surface side of the color filter substrate, followed by patterning. Alternatively, a method including forming a detection electrode on a support and then transferring the detection electrode on the color filter substrate can also eliminate the need for disposing a support in the liquid crystal panel to achieve the structure of Embodiment 4.

Embodiment 5

A liquid crystal display device of Embodiment 5 is different from that of Embodiment 1 in that the device includes not the on-cell touch panel 140 but a TFT substrate functioning as a touch panel (full in-cell touch panel).

Figure 5:
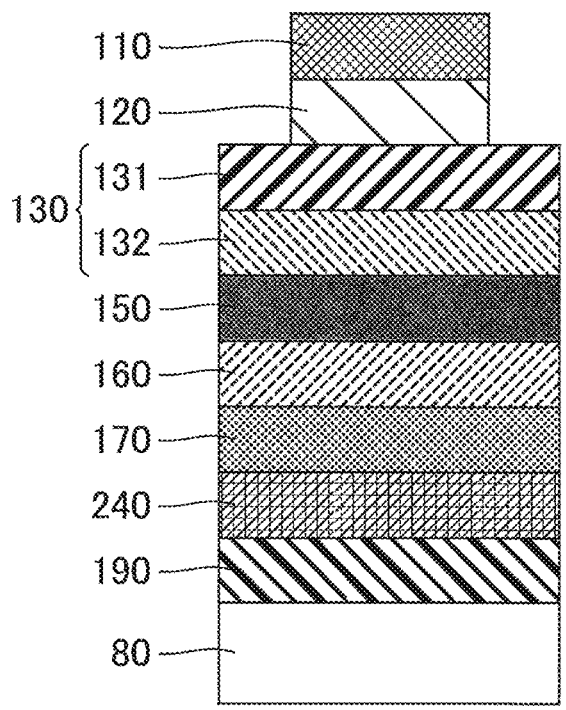
FIG. 5 is a schematic cross-sectional view showing the structure of a liquid crystal display device of Embodiment 5.

FIG. 5 is a schematic cross-sectional view showing the structure of the liquid crystal display device of Embodiment 5. As shown in FIG. 5, the liquid crystal display device of the present embodiment includes a liquid crystal panel including, in the order from the viewing surface side, the antireflection film 110, the cover glass 120, the circularly polarizing plate 130, the color filter substrate (panel substrate) 150, the λ/4 retarder (in-cell retarder) 160, the horizontally aligned liquid crystal layer 170, a touch-panel-equipped TFT substrate 240, and the linearly polarizing plate 190. The liquid crystal panel includes on the back surface side thereof the backlight 80. The circularly polarizing plate 130 consists of the linearly polarizing plate 131 and the λ/4 retarder (out-cell retarder) 132.

The touch-panel-equipped TFT substrate 240 can be formed by additionally disposing the following elements on a typical TFT substrate and thereby imparting the function of a touch panel to the TFT substrate.

Pixel electrode: an electrode outputting an image signal (this element is also disposed in a typical TFT substrate)

Counter electrode: an electrode for forming capacitance with the pixel electrode and used for controlling both of display of an image and detection of a touch position (although this element is also disposed on a typical TFT substrate, the difference here is being connected to the signal lines for the touch panel as well as to the source lines)

Figure 6:
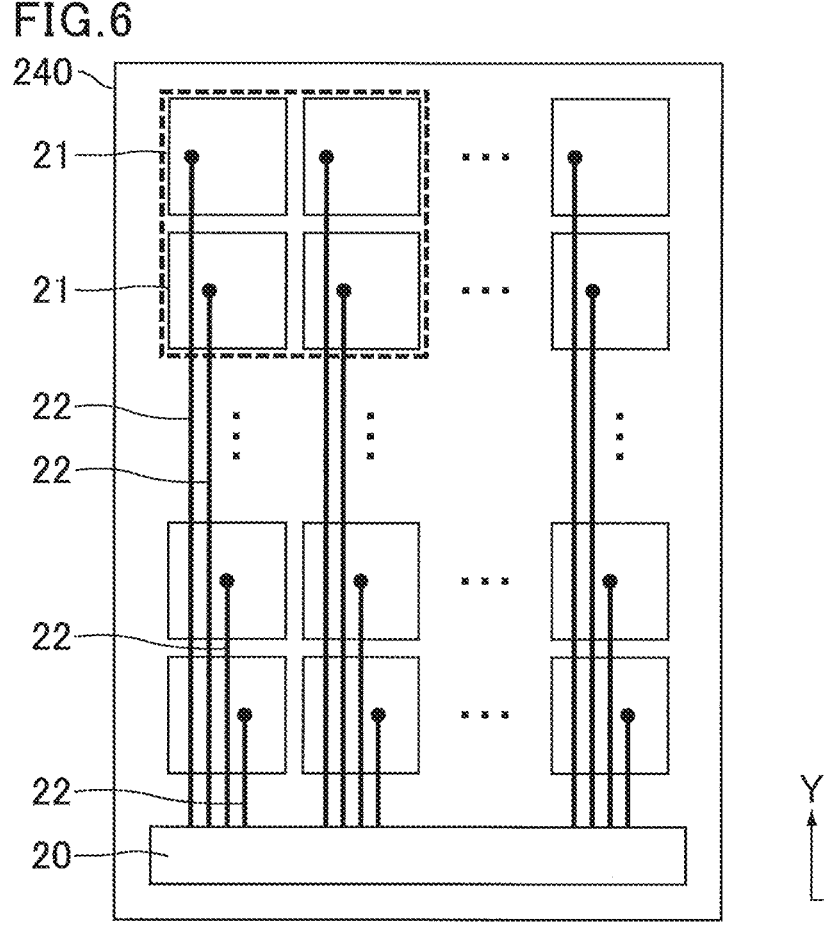
FIG. 6 is a schematic plan view showing an exemplary arrangement of counter electrodes formed on a touch-panel-equipped TFT substrate 240.
Figure 7:
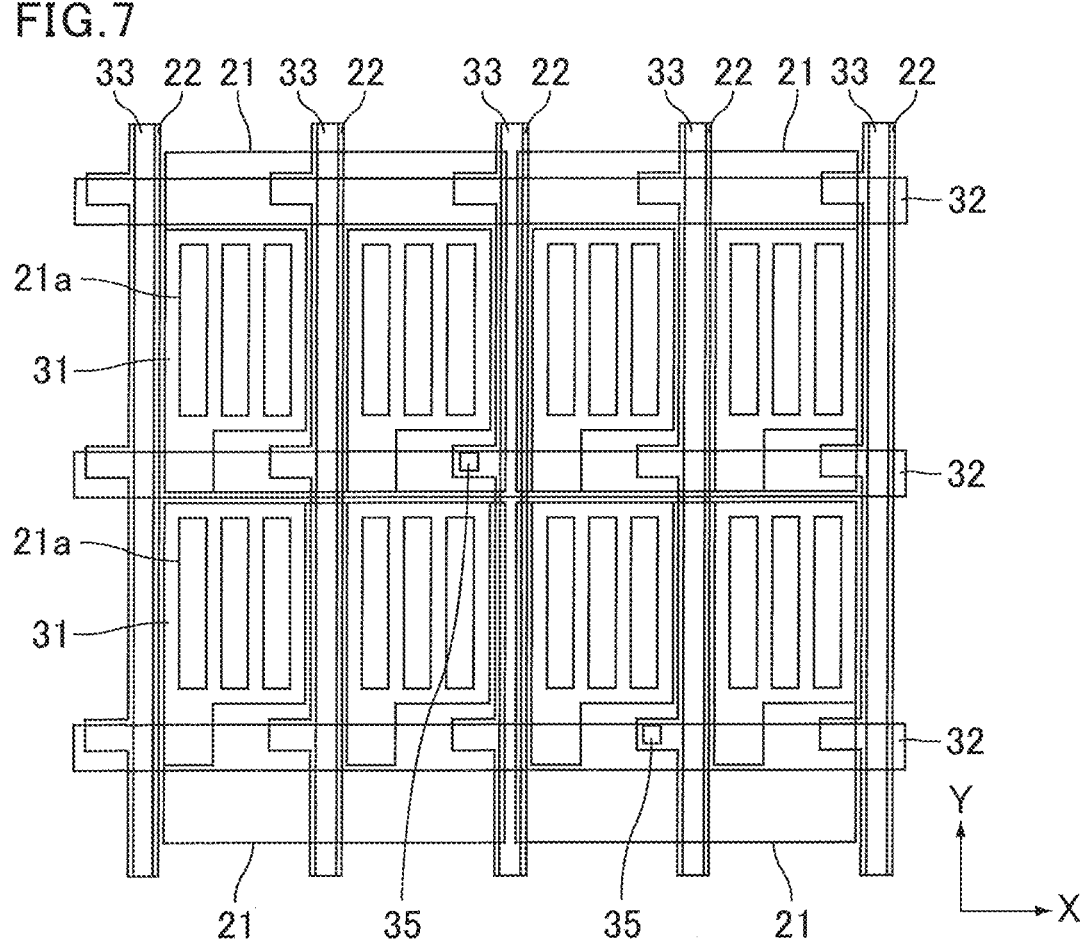
FIG. 7 is an enlarged schematic plan view showing the counter electrodes in FIG. 6.
Figure 8:
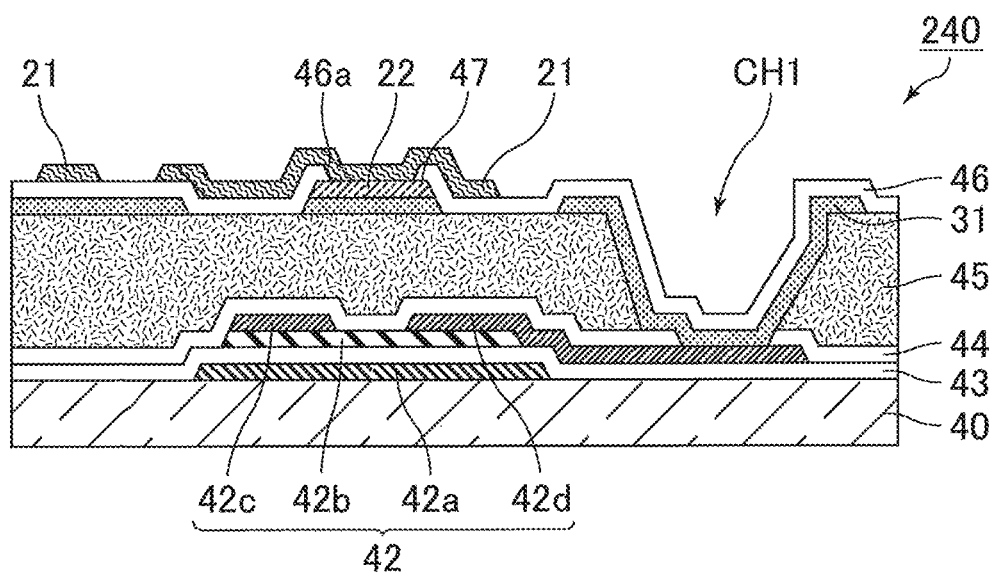
FIG. 8 is a schematic cross-sectional view of the touch-panel-equipped TFT substrate 240 at a part including a TFT.

Controller: an element for detecting a touch position by supplying the counter electrode with a touch drive signal Signal line: an element for connecting the controller and the counter electrode, allowing the controller to send a touch drive signal to the counter electrode, and allowing the controller to receive a touch detection signal which corresponds to the change in capacitance caused by human finger or the like in the counter electrode The touch-panel-equipped TFT substrate 240 may have a structure shown in FIGS. 6 to 8, for example. FIG. 6 is a schematic plan view showing an exemplary arrangement of counter electrodes formed on the touch-panel-equipped TFT substrate 240. FIG. 7 is an enlarged schematic plan view showing the counter electrodes in FIG. 6. FIG. 8 is a schematic cross-sectional view of the touch-panel-equipped TFT substrate 240 at a part including a TFT.

As shown in FIG. 6, counter electrodes 21 are formed on the liquid crystal layer side surface of the touch-panel-equipped TFT substrate 240. As shown in FIG. 6, the counter electrodes 21 each have a quadrangular shape and are arranged in a matrix on the touch-panel-equipped TFT substrate 240.

The touch-panel-equipped TFT substrate 240 is provided with a controller 20. The controller 20 controls display of an image and detection of a touch position.

The controller 20 is connected to the counter electrodes 21 via the respective signal lines 22 extending in the Y axis direction. In other words, the same number of the signal lines 22 and the counter electrodes 21 are formed on the touch-panel-equipped TFT substrate 240.

Each counter electrode 21 is used in pair with a pixel electrode for controlling display of an image and detection of a touch position.

Each counter electrode 21 forms parasitic capacitance with a member such as an adjacent counter electrode 21. When a human finger or the like touches the display surface of the display device, a capacity is formed between the counter electrode 21 and the human finger or the like to increase the capacitance. During controlling detection of the touch position, the controller 20 supplies the counter electrode 21 with a touch drive signal via the corresponding signal line 22 and receives a touch detection signal via the signal line 22. This enables detection of a change in capacitance to detect the touch position. In other words, the signal line 22 functions as a line for sending and receiving a touch drive signal and a touch detection signal.

As shown in FIG. 7, multiple pixel electrodes 31 are arranged in a matrix. Although not being shown in FIG. 7, thin film transistors (TFTs), which are display control elements, are also arranged in a matrix, corresponding to the pixel electrodes 31. Each counter electrode 21 is provided with slits 21*a*.

Around the pixel electrodes 31 are disposed gate lines 32 and source lines 33. The gate lines 32 each extend in the X axis direction and are disposed along the Y axis at certain intervals. The source lines 33 each extend in the Y axis direction and are disposed along the X axis at certain intervals. In other words, the gate lines 32 and the source lines 33 form a grid pattern, and the pixel electrodes 31 are disposed in the respective regions partitioned by the gate lines 32 and the source lines 33.

As shown in FIG. 7, the signal lines 22 extending in the Y axis direction overlap the source lines 33 extending in the Y axis direction, in the normal direction of the touch-panel-equipped TFT substrate 240. Specifically, the signal lines 22 are disposed in an upper layer than the layer including the source lines 33, and the signal lines 22 and the source lines 33 are overlapped in a plan view.

FIG. 7 shows connections 35 where the counter electrode 21*s* and the signal lines 22 are connected to each other.

As shown in FIG. 8, a TFT 42, which is a display control element, is disposed on a glass substrate 40. The TFT 42 includes a gate electrode 42*a*, a semiconductor film 42*b*, a source electrode 42*c*, and a drain electrode 42*d*.

The gate electrode 42*a* of the TFT 42 is formed on the glass substrate 40. The gate electrode 42*a* is formed from a multilayer film including a titanium (Ti) film and a copper (Cu) film, for example. A gate insulator 43 is formed so as to cover the gate electrode 42*a*. The gate insulator 43 is formed from silicon nitride (SiNx) or silicon dioxide ($SiO_2$), for example.

The semiconductor film 42*b* is disposed on the gate insulator 43. The semiconductor film 42*b* may be an oxide semiconductor film, for example, and may include at least one metal element of In, Ga, or Zn. In the present embodiment, the semiconductor film 42*b* includes an In—Ga—Zn—O semiconductor, for example. The In—Ga—Zn—O semiconductor is a ternary oxide of indium (In), gallium (Ga), and zinc (Zn). Examples of the proportions of (the composition ratio between) In, Ga, and Zn include: In:Ga:Zn=2:2:1, In:Ga:Zn=1:1:1, and In:Ga:Zn=1:1:2, although not being limited thereto.

The source electrode 42*c* and the drain electrode 42*d* are disposed with a space in between on the semiconductor film 42*b*. The source electrode 42*c* and the drain electrode 42*d* are each formed from a multilayer film including a titanium (Ti) film and a copper (Cu) film, for example.

A first insulating layer 44 is formed so as to cover the source electrode 42*c* and the drain electrode 42*d*. The first insulating layer 44 is formed from silicon nitride (SiNx) or silicon dioxide ($SiO_2$), for example.

On the first insulating layer 44 is formed a flattening film 45 which is an insulator. The flattening film 45 is formed from an acrylic resin material such as polymethyl methacrylate (PMMA) resin, for example. The flattening film 45 may not be disposed.

On the flattening film 45 is formed a pixel electrode 31. The pixel electrode 31 is a transparent electrode and formed from a material such as indium tin oxide (ITO), zinc oxide (ZnO), indium zinc oxide (IZO), indium gallium zinc oxide (IGZO), or indium tin zinc oxide (ITZO).

On the flattening film 45 is also formed a conductive film 47. The conductive film 47 is a transparent electrode film formed from the same material as the pixel electrode 31 and is disposed in order to improve the adhesiveness between the signal line 22 and the flattening film 45. Accordingly, the conductive film 47 may not be disposed when the adhesiveness between the signal line 22 and the flattening film 45 is high.

On the conductive film 47 is formed the signal line 22. The signal line 22 is formed from copper (Cu), titanium (Ti), molybdenum (Mo), aluminum (Al), magnesium (Mg), cobalt (Co), chromium (Cr), tungsten (W), or cadmium (Cd), or an alloy of these, for example. When the conductive film 47 is not disposed, the signal line 22 is formed on the flattening film 45.

A second insulating layer 46 is formed so as to cover the pixel electrode 31 and the signal line 22. The second insulating layer 46 is formed from silicon nitride (SiNx) or silicon dioxide ($SiO_2$), for example.

On the second insulating layer 46 is formed the counter electrode 21. The second insulating layer 46 is provided with an aperture 46*a* for connecting the counter electrode 21 and signal line 22. The counter electrode 21 is in contact with the signal line 22 at the aperture 46*a* in the second insulating layer 46. The counter electrode 21 is a transparent electrode and is formed from a material such as ITO, ZnO, IZO, IGZO, or ITZO.

The first insulating layer 44 and the flattening film 45 are each provided with a contact hole CH1. The pixel electrode 31 is in contact with the drain electrode 42d of the TFT 42 via the contact hole CH1.

Differently from the gate line 32 and the source line 33 for transmitting signals for display of an image, the signal line 22 is a line for transmitting touch drive signals and touch detection signals for detection of a touch position and thus needs to be disposed in a layer different from the layer including the TFT 42. The structure in which the signal line 22 is disposed in an upper layer than the layer including the counter electrode 21 may adversely influence a displayed image (may cause display noise) during control of detection of a touch position because the liquid crystal layer is present on the counter electrode 21. In the present embodiment, as shown in FIG. 8, the signal line 22 is disposed in the layer upper than the layer including the TFT 42 and lower than the layer including the counter electrode 21, which suppresses the influence on a displayed image during control of detection of a touch position.

The positional relations between the axes of the optical members in the liquid crystal panel of Embodiment 5 are as shown in FIG. 4B.

In Embodiment 5, forming a touch panel in the TFT substrate achieves similar performance to that of a conventional low reflective liquid crystal display device without a touch panel. In the structure of the conventional low reflective liquid crystal display device, although the circularly polarizing plate cannot absorb reflected light from the TFT substrate, color layers and a black matrix in the color filter substrate absorb most of the reflected light from the TFT substrate, which reduces the influence by the reflected light from the TFT substrate.

Example 11

A liquid crystal display device having the structure of Embodiment 5 was measured for the surface reflectance (Rs), the internal reflectance (Ri), the white luminance (Lw), and the black luminance (Lb), and the dark room contrast ratio at 0.1 lx (DCR) and the contrast ratio at 20000 lx (ACR) were calculated. Table 5 shows the results.

TABLE 5

|  | Example 11 |
| --- | --- |
| Surface reflectance (Rs) | 0.37% |
| Internal reflectance (Ri) | 0.15% |
| White luminance (Lw) | 400 cd/m$^2$ |
| Black luminance (Lb) | 0.49 cd/m$^2$ |
| DCR (0.1 lx) | 810:1 |
| ACR (20000 lx) | 24:1 |

As shown in Table 5, the structure of Embodiment 5 enables disposition of a touch panel and an increase in both DCR and ACR without causing retardation unnecessary for a low reflective liquid crystal display device.

Comparative Example 3

A liquid crystal display device of Comparative Example 3 is different from that of Embodiment 1 in that the touch panel is disposed on the viewing surface side of the circularly polarizing plate. In other words, in Comparative Example 3, an out-cell touch panel is used. Furthermore, the support in the out-cell touch panel is formed from polyethylene terephthalate (PET).

Figure 9A:
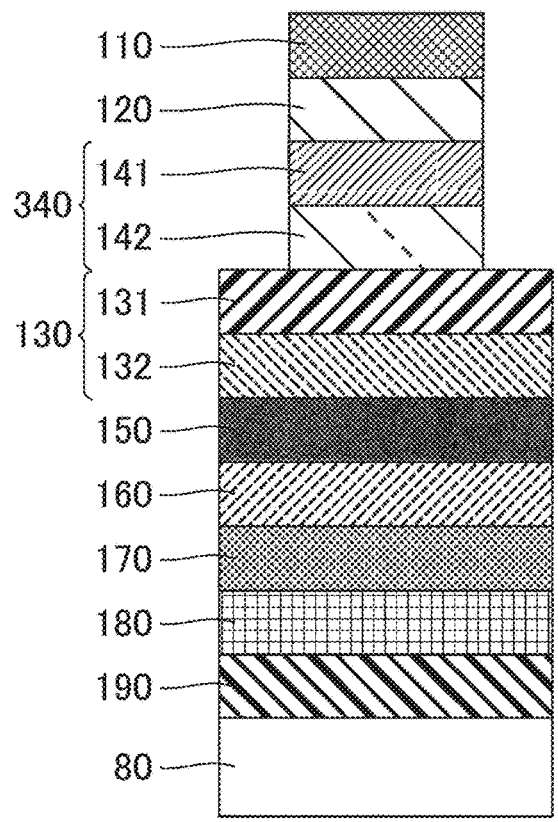
FIG. 9A is a schematic cross-sectional view showing the structure of a liquid crystal display device of Comparative Example 3.

FIG. 9A is a schematic cross-sectional view showing the structure of the liquid crystal display device of Comparative Example 3. As shown in FIG. 9A, the liquid crystal display device of Comparative Example 3 includes a liquid crystal panel including, in the order from the viewing surface side, the antireflection film 110, the cover glass 120, the out-cell touch panel 340, the circularly polarizing plate 130, the color filter substrate 150, the λ/4 retarder (in-cell retarder) 160, the horizontally aligned liquid crystal layer 170, the TFT substrate 180, and the linearly polarizing plate 190. The liquid crystal panel includes on the back surface side thereof the backlight 80.

The circularly polarizing plate 130 consists of the linearly polarizing plate 131 and the λ/4 retarder (out-cell retarder) 132. The out-cell touch panel 340 consists of the detection electrode 141 and the support 142.

Figure 9B:
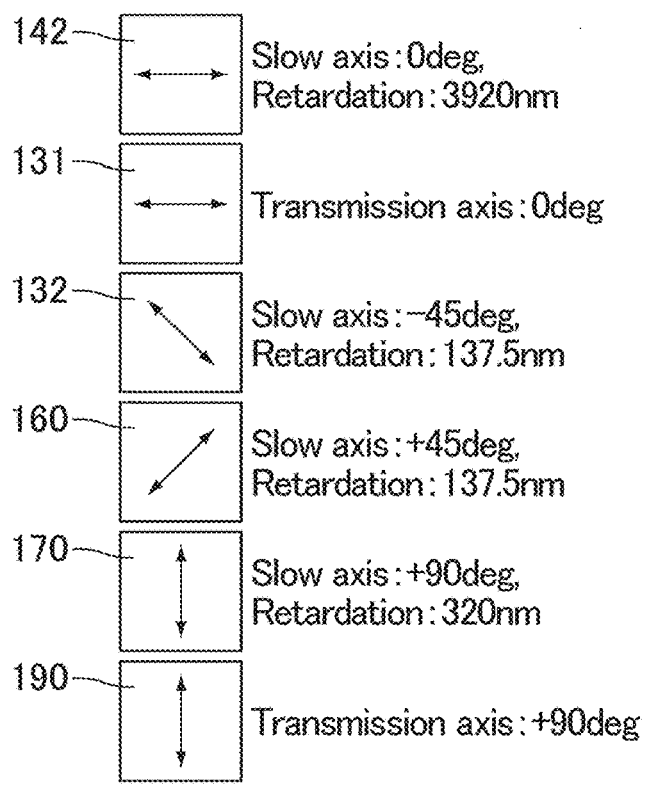
FIG. 9B is a figure illustrating the positional relations between the axes of optical members included in a liquid crystal panel of Comparative Example 3.
Figure 10:
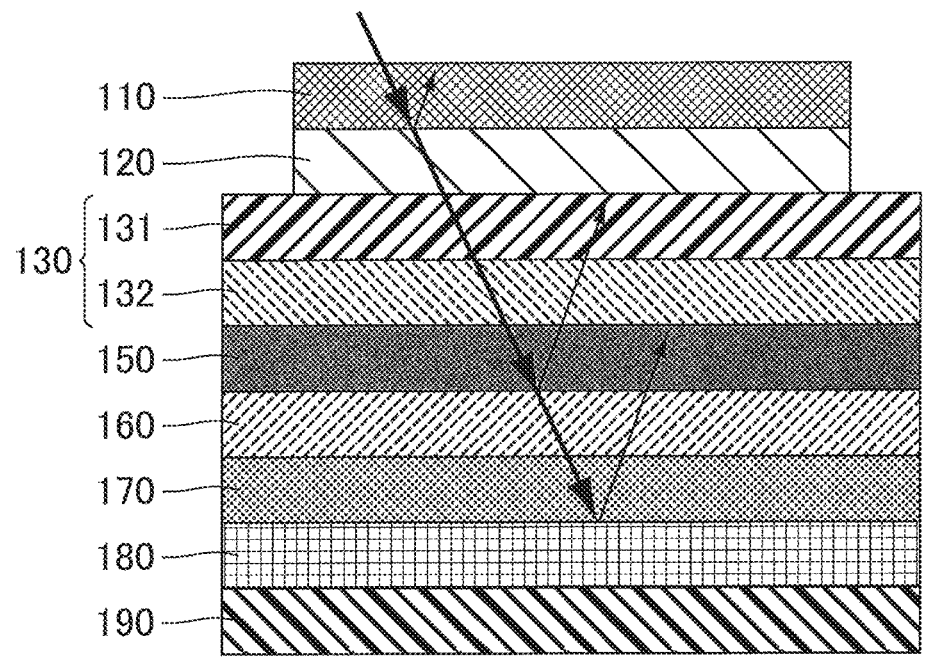
FIG. 10 is a figure illustrating reflection of external light incident on a liquid crystal panel having on a surface thereof a circularly polarizing plate.
Figure 11:
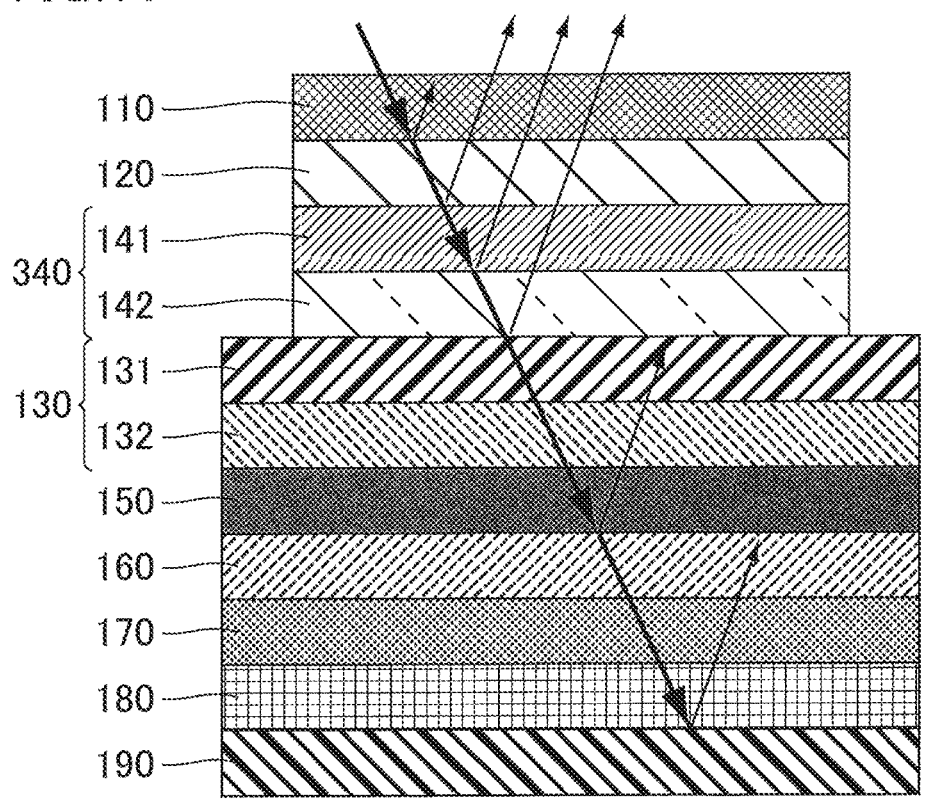
FIG. 11 is a figure illustrating reflection of incident external light when a liquid crystal panel having on a surface thereof a circularly polarizing plate is retrofitted with a touch panel.

FIG. 9B is a figure illustrating the positional relations between the axes of optical members included in the liquid crystal panel of Comparative Example 3. Arrows in FIG. 9B indicate directions of axes as viewed from the viewing surface side. As shown in FIG. 9B, when the direction (azimuth angle) of the transmission axis of the linearly polarizing plate 131 is defined as 0°, the support 142 of the out-cell touch panel 340 has a slow axis at 0° and a retardation of 3920 nm, the out-cell retarder 132 has a slow axis at −45° and a retardation of 137.5 nm, the in-cell retarder 160 has a slow axis at +45° and a retardation of 137.5 nm, the horizontally aligned liquid crystal layer 170 has a slow axis at +90° and a retardation of 320 nm, and the linearly polarizing plate 190 has a transmission axis at 90°. In other words, the retardation slow axis of the support 142 is designed to form an angle of 45° both to the slow axis of the out-cell retarder 132 and to the slow axis of the in-cell retarder 160.

The liquid crystal display device of Comparative Example 3 was measured for the surface reflectance (Rs), the internal reflectance (Ri), the white luminance (Lw), and the black luminance (Lb), and the dark room contrast ratio at 0.1 lx (DCR) and the contrast ratio at 20000 lx (ACR) were calculated. Table 6 shows the results.

TABLE 6

|  | Comparative Example 3 |
| --- | --- |
| Surface reflectance (Rs) | 0.37% |
| Internal reflectance (Ri) | 1.36% |
| White luminance (Lw) | 400 cd/m$^2$ |
| Black luminance (Lb) | 0.49 cd/m$^2$ |
| DCR (0.1 lx) | 810:1 |
| ACR (20000 lx) | 8:1 |

As shown in Table 6, the ACR was 8:1, which was below the target ratio 10:1. The reason for this is as follows. The refractive index of ITO (about 1.86) forming the detection electrode 141 of the touch panel and the refractive index of a PET film (about 1.67) forming the support 142 are higher than the refractive index of the cover glass 120 (about 1.50) and the refractive index of TAC or hard coat (about 1.50) forming the outermost surface of the polarizing plate, which causes reflection at the both interfaces of the touch panel. The structure in Comparative Example 3, in which a touch panel is retrofitted on a low reflective liquid crystal panel, fails in suppressing the reflection from the touch panel, thereby causing an increased internal reflectance of the liquid crystal display device and a reduced ACR.

Comparative Example 4

A liquid crystal display device of Comparative Example 4 has the same structure as in Embodiment 1, except that a stretched polyethylene terephthalate (PET) film is used as the support 142 of the on-cell touch panel 140. A stretched PET film exerts a large retardation. Thus, the retardation of the support 142 was 3920 nm.

The liquid crystal display device of Comparative Example 4 failed in providing a black display state, which is worse than the state of having a reduced ACR. Basically, a black display state was achieved by arranging an in-cell retarder and an out-cell retarder having the same retardation perpendicular to each other and thereby allowing cancellation of the each other's optical actions. In Comparative Example 4, a stretched PET film with a great retardation was disposed between the out-cell retarder and the in-cell retarder to prevent the cancellation of the each other's optical actions.

What is claimed is:

1. A liquid crystal panel comprising in the following order from a viewing surface side:
    an antireflection film;
    a circularly polarizing plate including a linearly polarizing plate and an out-cell retarder;
    a touch panel including a support and a detection electrode;
    a panel substrate; and
    an in-cell retarder,
    the support having a retardation slow axis that forms an angle of 40° to 50° with a slow axis of the in-cell retarder and with a slow axis of the out-cell retarder,
    the support having a retardation of 3 nm or smaller.

2. A liquid crystal panel comprising in the following order from a viewing surface side:
    an antireflection film;
    a circularly polarizing plate including a linearly polarizing plate and an out-cell retarder;
    a touch panel including a support and a detection electrode;
    a panel substrate; and
    an in-cell retarder,
    the support having a retardation slow axis that forms an angle of −5° to +5° with a slow axis of the in-cell retarder and an angle of 85° to 95° with a slow axis of the out-cell retarder,
    the support having a retardation of greater than 3 nm and smaller than 50 nm,
    a sum of the retardation of the support and the retardation of the in-cell retarder being 117.5 nm to 157.5 nm.

3. A liquid crystal panel comprising in the following order from a viewing surface side:
    an antireflection film;
    a circularly polarizing plate including a linearly polarizing plate and an out-cell retarder;
    a touch panel including a support and a detection electrode;
    a panel substrate; and
    an in-cell retarder,
    the support having a retardation slow axis that forms an angle of 85° to 95° with a slow axis of the in-cell retarder and an angle of −5° to +5° with a slow axis of the out-cell retarder,
    the support having a retardation of greater than 3 nm and smaller than 137.5 nm,
    a sum of the retardation of the support and the retardation of the out-cell retarder being 117.5 nm to 157.5 nm.

* * * * *